UNITED STATES PATENT OFFICE.

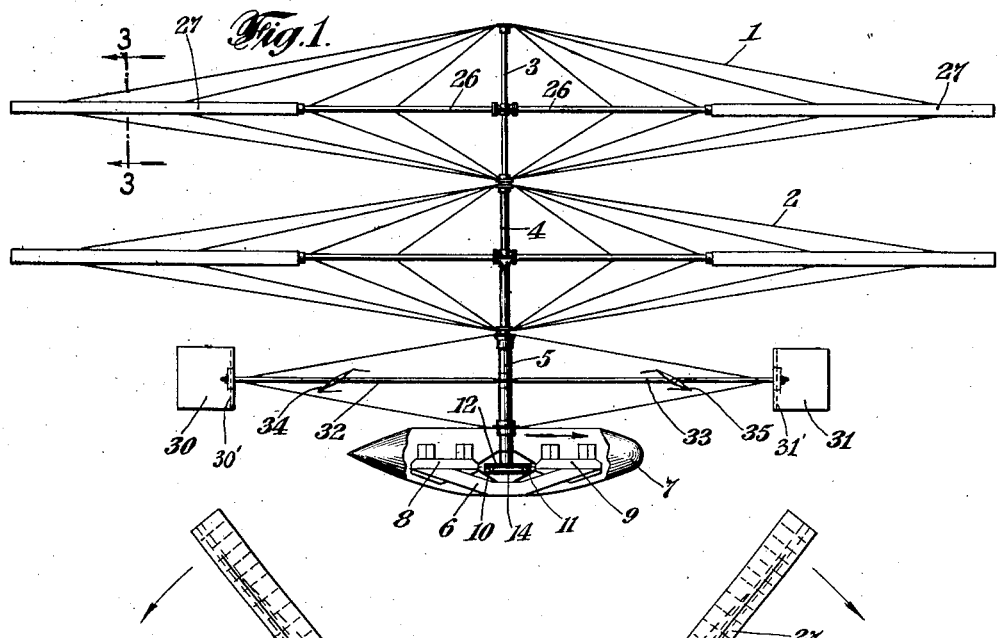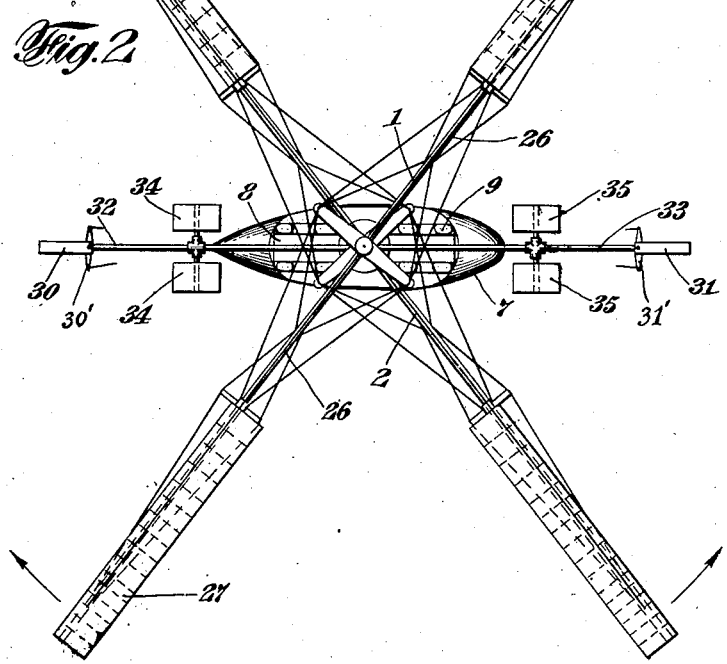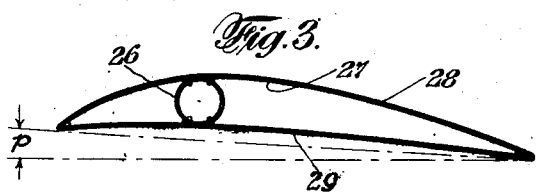

PETER COOPER HEWITT, OF RINGWOOD MANOR, NEW JERSEY.

FLYING-MACHINE.

1,350,454.  Specification of Letters Patent.  Patented Aug. 24, 1920.

Application filed June 14, 1919. Serial No. 304,187.

*To all whom it may concern:*

Be it known that I, PETER COOPER HEWITT, a citizen of the United States, and a resident of Ringwood Manor, Passaic county, State of New Jersey, have invented certain new and useful Improvements in Flying-Machines, of which the following is a specification.

My invention relates to flying machines of the type known as helicopters in which the machine is lifted by the action of propellers rotating about a vertical or upright axis. The object of the invention is to provide a helicopter capable of practical operation and use, and to render available the advantages of this type of flying machine.

Some of the general principles of operation of helicopters, and some of their advantages, have long been known or worked out, but, so far as known to me, no one prior to my invention has pointed out how to make practical operative machines. For example, it is known that in practical use a helicopter or other aeroplane, to be of any use, must be capable of affording a thrust or lifting power sufficient to sustain a substantial weight in excess of its own weight; that is the weight of the fuselage and the other parts of the machine, the operator and the varying temporary loads to be carried, and to give such lifting power or thrust at the practical requirements in thrust per horse power at the required horse power or of giving the necessary thrust per horse power, as required, which for fast machines should not be less than about 12 pounds per horse power, and for a practical weight carrying machine from 20 to 40 pounds per horse power and it must be capable of meeting the numerous other requirements arising in practice, allowing the latitude for necessary differences between fast machines and slower weight carriers. By means of my improvements I have been able to produce a helicopter which, with the large weight to be lifted and the high horse power to be used is capable of giving the requisite thrust per horse power required for the purpose, which meets all the requirements of practical uses and which form practical type of operative machines having the necessary structural strength at an operative and permissible weight.

In carrying out my invention I use propellers having blades of the form substantially of aeroplane wings, preferably of approved aeroform outline or contour, the propellers being of large diameter, much larger than any heretofore in use, and provided with blades that are narrow and long, i. e., having an advantageously large aspect ratio, and whose area is relatively very small compared to that of the disk area of the propeller, the effective length of the blades being preferably positioned away from the center of rotation at between one-fifth and two-fifths, of the radius of the propeller. In connection with such propellers I use, preferably, engines having a very high speed or large number of revolutions per minute, and this speed I reduce very largely, preferably at least 8 to 1, and for high power machines possibly in the ratio of 30 to 1, or even more. This, with the large diameter of the propellers, enables me to obtain a low angular velocity and a high peripheral speed. I also preferably arrange the blades of the propellers at a pitch angle substantially constant for all sizes and types of propellers and for all speeds, and make that angle substantially larger than would be the most efficient angle at which aeroplane wings would be most efficient, and sufficiently larger to compensate for the angle of tilt of the helicopter when flying horizontally and also for the difference in operation when standing still or flying horizontally. I also preferably mount the propeller blades to have a certain elasticity and so that the center of support thereof is forward of the center of pressure thereon to promote smooth running of the blade by reason of the pressure tending to diminish the pitch angle of the blade which is normally mantained by its support, that is, any pressure on the blade tends to decrease the angle and not to increase it when there is any elasticity or yielding of the support. Elasticity of support carefully adjusted is very desirable in many cases and may be useful in connection with the operation of the machine.

My improvements are a distinct departure from all prior attempts known to me in helicopters and aeroplanes. Heretofore propellers have always been of relatively small diameter, driven at high peripheral speed and high angular velocity, acting upon a relatively small jet of air put into rapid motion and greatly disturbed.

In my improved helicopter the propellers are large in diameter, are driven at a relatively low angular velocity but with a suitable peripheral speed, and act upon a large mass of air, and act upon it approaching the manner of aeroplane wings without imparting to the entire included mass the same rapid velocity and great disturbance given it by the ordinary propellers. The propellers should be made as large as practical, as it is better to err in this direction than by making the propeller too small. By these means and also by certain refinements of aeroform shape, improved angle of pitch and center of support, which features permit obtaining adequate structural strength at a weight much less than present practice, and in fact at about one-half of such weight, I am enabled to produce a helicopter that is operative and efficient, and that exerts not only the total thrust or lifting power needed to lift itself and its load, but also the desired thrust per horse power for the horse power required to be used, at the same time retaining the efficiency of high speed driving engines, and with latitude sufficient to enable its application to the varying demands imposed by commercial requirements.

In order that my invention may be more clearly understood, attention is directed to the accompanying drawing forming part of this specification and illustrating one embodiment of my invention.

In the drawing, Figure 1 is a side elevation of said embodiment of my invention, part of the fuselage or car being broken away;

Fig. 2 is a top plan view thereof; and

Fig. 3 is a vertical section of a propeller blade taken on the line 3—3 of Fig. 1.

The helicopter shown comprises an upper propeller 1 and a propeller 2 below the same, the propeller 1 being carried by a normally vertical shaft 3 which passes through the tubular shaft 4 of the propeller 2. The shaft 4 extends through a stationary tubular bearing 5 forming part of the frame 6 of the machine. This frame carries a fuselage or car 7.

For general practical purposes I find that the diameter of the propeller should be as much as $$\frac{T}{H.P.} \times \frac{\sqrt{T}}{17}$$

and at least equal to $$.7\frac{T}{H.P.} \times \frac{\sqrt{T}}{17}$$

for fast machines and machines when smaller diameter is desirable, where T equals the total thrust or lift of the propellers in pounds and H. P. the horse power applied thereto, and where T is not less than 12 pounds per horse power and may be 30 pounds per horse power or more as desired. I have constructed a helicopter having a lift of 2550 pounds with a horse power of 126.5. The two propellers of this machine are each 51 feet in diameter. By further refinements in the propeller and the other parts of the machine, I estimate that the propeller diameter for this machine may be decreased to about 42 feet with a probable loss in efficiency in lift per horse power, but it would still be practically operative. The machine as constructed is capable of giving a total lift of about 4,000 pounds.

The shafts 3 and 4 and the propellers carried thereby are driven in opposite directions by motors or engines 8 and 9 of substantially equal power arranged one to the front and the other to the rear of the shafts 3 and 4, and having their driving shafts in axial alinement longitudinally of the fuselage 7, the axis of said driving shafts intersecting the axis of the shafts 3 and 4 at right angles. The shaft of the engine or motor 8 is provided with a beveled pinion 10, and the shaft of the motor 9 with the beveled pinion 11. Each of these pinions meshes with a larger beveled gear 12 secured to the shaft 4 above the pinion, and also with the beveled gear 14 secured to the shaft 3 below the pinion, the gear 14 being of the same diameter as gear 12.

The arrangement shown is such that a balanced action is obtained in driving the shafts 3 and 4, and there is substantially no lateral thrust on the various bearings inasmuch as each moving part of the mechanism is acted upon by equal forces acting in opposite directions. Each of the gears 12 and 14, for example, is acted upon on one side of its axis by the pinion 10, tending to drive the same in one direction, for example, forwardly, referring to Fig. 1, while on the other side of its axis it is acted upon by the pinion 11, tending to drive the same in the opposite direction, or rearwardly in the case assumed. In other words, a true dynamic couple is obtained, causing rotation with no lateral thrust upon the bearings with the motors exerting equal power. The driving means for the propellers are claimed in another application filed on even date herewith, and a further description thereof is thought to be unnecessary herein. As engines suitable for flying machines have a very high speed or large number of revolutions per minute, and as the angular velocity of my lifting propellers is very low, compared with propellers now in use, a very large speed reduction is employed between the motor or engine and the propeller shaft, in accordance with my invention. For practical purposes this reduction will best be at least 8 to 1, or 8 revolutions of the engine shaft to one of the propeller shaft, that is, the gears 12 and 14 in the form of the invention shown will have at least 8 times as many teeth as the pinions 10 and 11. The particular machine above referred to has a speed reduction of 14 to 1. In one set of gearing designed by me, the speed reduction is 23 revolutions of the engine shaft to one revolution of the propeller shaft, and with this type of gearing a far greater reduction may be readily made.

As shown, each of the propellers is provided with two arms 26 in alinement with each other, each of these arms carrying a blade 27. The propeller arms and blades may be held in proper relation to the propeller shafts by guy wires as shown.

Each of the propeller blades, as shown, is rigid and is formed by securing to each tubular arm 26 a plurality of cross braces or ribs 27 to which the covering, comprising the upper wall 28 and the lower wall 29 is secured. As shown in Fig. 2 the spacing between these cross-braces or ribs increases from the center to the inner end of the blade in order that the blade and its surface may have most rigidity or strength toward its outer end and where the stress thereon is greatest.

Referring to Fig. 3 it will be seen that the propeller blade has in cross section the shape of an aeroform aeroplane wing. Such wings have been the subject of considerable study and many of the improved wing shapes, known in the art as aeroform shapes, are shown and discussed in various publications including the authoritative book by Eiffel entitled: "*The Resistance of the Air and Aviation.*" Such shapes have upper and lower surfaces (or forward and rear surfaces considering the direction of thrust on the shape) of different contour in cross section; and it has been found that the lifting effect obtained by the upper surface is greater than that obtained by the lower surface. The wing shape used in my particular machine referred to above and shown herein is No. 63 in said book; this shape being a modification of form No. 31 of said book.

The propeller blade is supported so that the center of the support of the blade transversely to its length is forwardly of the center of pressure upon the blade. The location of the center of pressure and lift depends upon various factors, including the shape of the blade and the pitch angle thereof, and may be a substantial distance forwardly of the center of the blade. For a blade of the shape shown and supported as shown, the center of pressure will be between the longitudinal center line of the blade and the axis of the arm 26, and closer to the latter than to the former. In other words, the axis of the arm 26, or the center of the transverse support, is forwardly of the center of pressure, which center of pressure is usually twenty per cent. to thirty-three per cent. of the width of the blade rearwardly from the front edge thereof. As a result, the blade is pulled around by the supporting arm instead of being pushed, and danger of chattering is obviated, and at the same time automatic adjustment of the pitch angle of the blade is obtained within limits, the support of the blade being somewhat elastic. The construction and mounting of the propeller blades are claimed broadly in another application filed on even date herewith.

In accordance with my invention, I preferably use propeller blades of good aspect ratio, that is, large ratio of length to width of blade. I use a blade as long as practical, but the portion of the blade adjacent the axis of rotation of the propeller is very ineffective and for a certain distance from said axle, the lift or thrust of the blade is not equal to its own weight at the low angular velocities employed. I accordingly preferably terminate the thrust yielding inner end of the blade, particularly for large horse powers, between one-fifth and two-fifths of the radius of the propeller from the axis of the propeller, and desirably even at a greater distance if suitable aspect ratio is maintained for the advantage obtained thereby, for horizontal flight. The greatest lift or thrust of the blade is obviously at its outer end. Even if the blade extends into the axle of the propeller, there should be an effective aspect ratio of the desired amount beyond a point at least one-fifth of the radius from the axle. In the machine referred to above with a propeller diameter of 51 feet, or a radius of 25.5 feet, the blades preferably have a length of three-fifths to four-fifths of the radius, or about 15 to 20 feet, and are preferably spaced from the axis of the propeller a distance equal to two-fifths of the radius. The width of the blades for two propellers, each with two blades, may then be about 30 inches or when designed for slow running about 40 inches. The aspect ratio is under these conditions about 6 to 1; and the blade area for all four blades of both propellers is about 6 per cent. of the propeller disk area, that is, of the area of a single disk having the same diameter as the propeller, but for slower speed it may be 9 per cent. In general for best results the aspect ratio is desirably at least 5 to 1, and the blade area not more than about 3 per cent. to about 12 per cent. of the disk area, but an intermediate value will be found desirable for most purposes, and will permit latitude for variation of blade form. When two propellers are used, as shown, the blade area of each propeller should not be more than one-half of the above figures.

For obtaining a maximum of efficiency, the pitch angle or angle of incidence of the propeller will best be substantially constant for all sizes of propellers, but may be modified by the aero dynamic characteristic of the shape of blade used and the practical use for which the helicopter is designed. The most efficient pitch angle for the blade is different when the machine is moving horizontally, than when it is moving vertically. In the latter case there is a movement of the air axially of the propeller which obviously makes the effective pitch angle of the blades different from the actual pitch angle thereof. For practical purposes the most serviceable pitch angle will lie about from 6° to 24° to the horizontal, this being the angle made with the horizontal by a chord between the forward and rear edges of the lower or rear surface of the blade; and for fast machines it may be found desirable to use a lesser angle toward the center than at the tip of blade. Excellent results were obtained by pitch angles between 9° and 13°. That is, about 3° to 8° added to the most efficient angle of the blade acting as an aeroplane wing and giving the maximum lift per horse power, taken from Eiffel researches will give very satisfactory results. The actual pitch angle will be substantially greater by some number of degrees than the most efficient angle of pitch for the blades so that when the helicopter is passing horizontally through the air it will give substantially the efficient angle when the helicopter is tilted from horizontal. The pitch angle is designated $p$ in Fig. 3.

While the various parts of the machine may be made of any suitable material, I prefer to make the blades of the propellers of sheet metal of light weight, such as aluminum, and the supporting and driving means for the propeller blades of strong structural material, such as steel.

For turning the machine about the axis of the shafts 3 and 4 so as to enable it to face in different directions, I provide planes or wings 30 and 31 located at the extremities of the arms 32 and 33, respectively, of the frame of the machine. These planes are capable of being tilted about a horizontal axis passing through their centers, and are located below the propeller blades so as to receive the down draft therefrom when the propellers are rotated. When it is desired to turn the machine about the axis of the shafts 3 and 4, the planes 30 and 31 are tilted in opposite directions away from their normally vertical positions. The result is that the down draft from the propeller blades, the propellers rotating, tends to cause the plane 30 to move in one direction, and the plane 31 to move in the opposite direction, thereby producing a dynamic couple which tends to rotate the machine as desired. As soon as a machine has been rotated to the desired position, the planes 30 and 31 are returned by the operator to normal vertical position. These planes may be used to correct any tendency of the body to rotate due to unequal action of the propellers. They may also be arranged so as to be rotatable about vertical axes 30' and 31' like rudders so as to be capable of being used to balance unequal effort of the propellers tending to turn the machine when it is in horizontal movement or of being used to turn the machine when it is moving horizontally.

In case it is desired to tilt the machine so as to produce lateral motion thereof as understood in the art, only the plane 31 is moved to horizontal position, the other remaining vertical, whereupon the down draft from the rotating propellers forces this blade downwardly and tilts the machine.

Independent means are desirably provided for maintaining the machine tilted after it has begun its movement laterally. These means, as shown, comprise planes or wings 34 and 35 carried by the arms 32 and 33, respectively, and rotatable about horizontal axes transverse to the arms 32 and 33. Each of the planes 34 and 35, as shown, comprises a section mounted on each of the two sides of the machine. These planes are located inwardly of the inner edges of the propeller blades and do not receive any down draft therefrom. By inclining them in opposite directions, as shown, the air will, if the machine moves forwardly in the direction of the arrow, press against the upper surface of the plane 35 and the lower surface of plane 34, thereby producing a dynamic couple tending to maintain the machine tilted against its tendency to right itself. The steering means herein described are claimed and more fully shown in another application filed on even date herewith.

Other means of control for my invention may be used without departing from the invention herein disclosed and claimed; and in general it is to be understood that I am not limited to the specific features described and shown, as these might be departed from while still employing the invention set forth in the appended claims.

What I claim as new and desire to secure by Letters Patent is:

1. A helicopter having a plurality of lifting propellers, the diameter of the propellers being no less than $$.7 \frac{T}{H.P.} \times \frac{\sqrt{T}}{17},$$

where the lift per horse power is no less than 12 pounds per horse power, the aspect ratio of the propeller blades being at least five to one and the blade area of the propellers being no greater than 12% of the propeller disk area.

2. A helicopter having a plurality of lifting propellers, the diameter of the propellers being no less than $$.7\frac{T}{H.P.} \times \frac{\sqrt{T}}{17},$$

where the lift per horse power is no less than 12 pounds per horse power, the aspect ratio of the propeller blades being at least five to one and the blade area of the propellers being no greater than 12% of the propeller disk area, the innermost effective portions of the blades being distant at least one-fifth of the radius of the propeller from the axis of rotation thereof.

3. A helicopter having a plurality of lifting propellers, the diameter of the propellers being no less than $$.7\frac{T}{H.P.} \times \frac{\sqrt{T}}{17},$$

where the lift per horse power is no less than 12 pounds per horse power, the aspect ratio of the propeller blades being at least five to one and the blade area of the propellers being no greater than 12% of the propeller disk area, driving means and speed reducing means between said driving means and propellers, said speed reducing means reducing the speed of the propellers to many times less than that of said driving means.

4. A helicopter having a plurality of lifting propellers, the diameter of the propellers being no less than $$.7\frac{T}{H.P.} \times \frac{\sqrt{T}}{17},$$

where the lift per horse power is no less than 12 pounds per horse power, the aspect ratio of the propeller blades being at least five to one and the blade area of the propellers being no greater than 10% of the propeller disk area, the blades of the helicopter being arranged at a pitch angle of between 6 degrees and 16 degrees to the horizontal when the helicopter is vertical.

5. A helicopter having a plurality of lifting propellers, the diameter of the propellers being no less than $$.7\frac{T}{H.P.} \times \frac{\sqrt{T}}{17},$$

where the lift per horse power is no less than 12 pounds per horse power, the aspect ratio of the propeller blades being at least five to one and the blade area of the propeller being no greater than 10% of the propeller disk area, the center of support of the blades being forwardly of the center of lift thereof.

6. A helicopter having a plurality of lifting propellers, the diameter of the propellers being no less than.

$$.7\frac{T}{H.P.} \times \frac{\sqrt{T}}{17},$$

where the lift per horse power is no less than 12 pounds per horse power, the aspect ratio of the propeller blades being at least five to one and the blade area of the propellers being no greater than 12% of the propeller disk area, the blades of the helicopter being arranged at a pitch angle of between 6 degrees and 24 degrees to the horizontal when the helicopter is vertical and being of aeroform shape.

7. A helicopter having a plurality of lifting propellers, the diameter of the propellers being no less than $$.7\frac{T}{H.P.} \times \frac{\sqrt{T}}{17},$$

where the lift per horse power is no less than 12 pounds per horse power, the aspect ratio of the propeller blades being at least five to one and the blade area of the propellers being no greater than 12% of the propeller disk area, the said blades being arranged at a pitch angle of between 6 degrees and 24 degrees to the horizontal when the helicopter is vertical, being of aeroform shape and having the center of support thereof forwardly of the center of lift thereof.

8. A helicopter having a plurality of lifting propellers, the diameter of the propellers being no less than $$.7\frac{T}{H.P.} \times \frac{\sqrt{T}}{17},$$

where the lift per horse power is no less than 12 pounds per horse power, the aspect ratio of the propeller blades being at least five to one and the blade area of the propellers being no greater than 12% of the propeller disk area, the said blades being arranged at a pitch angle of between 6 degrees and 24 degrees to the horizontal when the helicopter is vertical and being of aeroform shape, driving means and speed reducing means between said driving means and propellers, said speed reducing means reducing the speed of the propellers to many times less than that of said driving means.

9. A helicopter having a plurality of lifting propellers, the diameter of the propellers being no less than $$.7\frac{T}{H.P.} \times \frac{\sqrt{T}}{17},$$

where the lift per horse power is no less than 12 pounds per horse power, the aspect ratio of the propeller blades being at least five to one and the blade area of the propellers being no greater than 12% of the propeller disk area, the said blades being arranged at a pitch angle of between 6 degrees and 24 degrees to the horizontal when the helicopter is vertical and being of aeroform shape, the innermost effective portions of the blades being distant at least ⅕ of the radius of propeller from the axis of rotation thereof.

10. A helicopter having a plurality of lifting propellers, the diameter of the propellers being no less than $$.7\frac{T}{H.P.} \times \frac{\sqrt{T}}{17},$$

where the lift per horse power is no less than 12 pounds per horse power, the aspect ratio of the propeller blades being at least five to one and the blade area of the propellers being no greater than 12% of the propeller disk area, the said blades being of aeroform shape and having their innermost effective portions distant at least one-fifth of the radius of propeller from the axis of rotation thereof.

11. A helicopter having a lifting propeller, the diameter of which is no less than $$.7\frac{T}{H.P.} \times \frac{\sqrt{T}}{17},$$

where the lift per horse power is no less than 12 pounds per horse power.

12. A helicopter having a lifting propeller, the diameter of which is at least 42 feet.

13. A helicopter having a lifting propeller, the diameter of which is at least 42 feet, the blade area of the propeller being no greater than 6% of the disk area of the propeller.

14. A helicopter having a lifting propeller, the diameter of which is between $$\frac{T}{H.P.} \times \frac{\sqrt{T}}{17}$$

and $$.7\frac{T}{H.P.} \times \frac{\sqrt{T}}{17},$$

where the lift per horse power is no less than 12 pounds per horse power, the propeller blade area being no greater than 6% of the disk area of said propeller.

15. A helicopter having a lifting propeller provided with blades, the aspect ratio of which is at least 5 to 1, the blade area of the propeller being no greater than 6% of the disk area of the propeller.

16. A helicopter having a lifting propeller, provided with blades having an aspect ratio of at least 6 to 1, the innermost effective portions of the blades being distant at least one-fifth of the radius of the propeller from the axis of rotation thereof.

17. A helicopter having a lifting propeller provided with blades, the aspect ratio of which is at least 5 to 1, the blade area of the propeller being no greater than 6% of the disk area of the propeller, the innermost effective portions of the blades being distant at least one-fifth of the radius of the propeller from the axis of rotation thereof.

18. A helicopter having a lifting propeller, the blade area of the propeller being no greater than 6% of the disk area thereof, the blade being spaced from the axis of the propeller a distance no greater than one half the radius of the propeller.

19. A helicopter having a lifting propeller, the blade area of the propeller being no greater than 6% of the disk area of the propeller, the innermost effective portions of the blade being distant between one-fifth and one half of the radius of the propeller from the axis of rotation thereof.

20. A helicopter having a lifting propeller provided with blades of aeroform shape, the blade area of the propeller being no greater than 6% of the disk area of the propeller.

21. A helicopter having a lifting propeller provided with blades of aeroform shape, the aspect ratio of the blades being no less than approximately 5 to 1.

22. A helicopter having a lifting propeller provided with rigid blades of aeroform shape, the aspect ratio of the blades being no less than approximately 5 to 1.

23. A helicopter having a lifting propeller provided with blades acting substantially as aeroplane wings, the aspect ratio of the blades being no less than approximately 5 to 1.

24. A helicopter having a lifting propeller provided with blades of aeroform shape acting substantially as aeroplane wings, the aspect ratio of the blades being no less than approximately 5 to 1.

25. A helicopter having a lifting propeller, said propeller being provided with blades of aeroform shape having an aspect ratio of at least 5 to 1, the propeller blade area being no greater than 6% of the disk area of said propeller.

26. A helicopter having a lifting propeller provided with blades of aeroform shape arranged at a pitch angle of between 6 degrees and 24 degrees to the horizontal when the helicopter is vertical.

27. A helicopter having a lifting propeller provided with blades of aeroform shape arranged at a pitch angle of between 6 degrees and 24 degrees to the horizontal when the helicopter is vertical, the center of support of the propeller blades being forwardly of the center of pressure thereof.

28. A helicopter having at least one lifting propeller the propeller diameter being between $$\frac{T}{H.P.} \times \frac{\sqrt{T}}{17}$$

and $$.7\frac{T}{H.P.} \times \frac{\sqrt{T}}{17},$$

where the lift per horse power is no less than 12 pounds per horse power, the propeller blade area being no greater than 6% of the propeller disk area and the propeller blades being of aeroform shape.

29. A helicopter having a lifting propeller provided with lifting blades arranged at a pitch angle of between 6 degrees and 24 degrees to the horizontal when the helicopter is vertical, the aspect ratio of the blades being no less than approximately 5 to 1.

30. A helicopter having a lifting propeller provided with lifting blades arranged at a pitch angle of between 6 degrees and 24 degrees to the horizontal when the helicopter is vertical, the center of support of said blades being forwardly of the center of pressure thereof.

31. A helicopter having a lifting propeller, the said propeller having blades of aeroform shape having an aspect ratio of at least 5 to 1 and arranged at a pitch angle of between 6 degrees and 24 degrees to the horizontal when the helicopter is vertical, the propeller blade area being no greater than 6% of the disk area of the propeller.

32. A helicopter having a lifting propeller provided with blades having an aspect ratio of at least 5 to 1, the center of support of the blades being forwardly of the center of pressure thereof.

33. A helicopter having a lifting propeller provided with blades having an aspect ratio of at least 5 to 1, the center of support of the blades being forwardly of the center of pressure thereof, the blade area of said propeller being no greater than 6% of the propeller disk area.

34. A helicopter having lifting propellers, the diameter of which is between $$\frac{T}{H.P.} \times \frac{\sqrt{T}}{17}$$

and $$.7\frac{T}{H.P.} \times \frac{\sqrt{T}}{17},$$

where the lift per horse power is at least 12 pounds per horse power and the horse power is no less than 100, driving means for said propellers, and speed reducing means between said driving means and propellers, said speed reducing means reducing the speed of the propellers to many times less than that of said driving means, said propellers having blades of aeroform shape arranged at a pitch angle of between 6 degrees and 24 degrees to the horizontal when the helicopter is vertical, the propeller blade area being no greater than 12% of the propeller disk area, the aspect ratio of the propeller blades being at least 5 to 1 and the innermost effective portions of the blades being distant at least one-fifth of the radius of the propeller from the axis of rotation thereof.

35. A helicopter having lifting propellers the diameter of which is between $$\frac{T}{H.P.} \times \frac{\sqrt{T}}{17}$$

and $$.7\frac{T}{H.P.} \times \frac{\sqrt{T}}{17},$$

where the lift per horse power is at least 12 pounds per horse power, driving means for said propellers, and speed reducing means between said driving means and propellers, said speed reducing means reducing the speed of the propellers to many times less than that of said driving means, said propellers having blades of aeroform shape having their centers of support forwardly of their centers of lift arranged at a pitch angle of between 6 degrees and 24 degrees to the horizontal when the helicopter is vertical, the propeller blade area being no greater than 12% of the propeller disk area, the aspect ratio of the propeller blades being at least 5 to 1 and the innermost effective portions of the blades being distant at least one-fifth of the radius of the propeller from the axis of rotation thereof.

36. In a helicopter, the combination of a lifting propeller, the diameter of which is at least 42 feet, driving means therefor, and speed reducing means between said driving means and propeller, said speed reducing means reducing the speed of the propeller to may times less than that of said driving means.

37. A helicopter having lifting propellers, driving means therefor, and speed reducing means between said driving means and propellers, said speed reducing means reducing the speed of said propellers to many times less than that of said driving means, the diameter of said propellers being between $$\frac{T}{H.P.} \times \frac{\sqrt{T}}{17}$$

and $$.7\frac{T}{H.P.} \times \frac{\sqrt{T}}{17},$$

where the lift per horse power is no less than 12 pounds per horse power, the blades of said propellers being of aeroform shape and the blade area of the propellers being no greater than 12% of the propeller disk area.

38. A helicopter having a lifting propeller, driving means therefor, and speed reducing means between said driving means and propeller, said speed reducing means reducing the speed of said propeller to many times less than that of said driving means, the diameter of said propeller being between $$\frac{T}{H.P.} \times \frac{\sqrt{T}}{17}$$

and $$.7\frac{T}{H.P.} \times \frac{\sqrt{T}}{17},$$

where the lift per horse power is no less than 12 pounds per horse power, the blades of said propeller being of aeroform shape arranged at a pitch angle of between 6 degrees and 24 degrees to the horizontal when the helicopter is vertical, and the blade area of the propeller being no greater than 12% of the propeller disk area.

39. A helicopter having a lifting propeller having a diameter of between $$\frac{T}{H.P.} \times \frac{\sqrt{T}}{17}$$

and $$.7\frac{T}{H.P.} \times \frac{\sqrt{T}}{17},$$

where the lift per horse power is no less than 12 pounds per horse power, the blades of said propeller having their centers of support forwardly of their respective centers of pressure.

40. In a helicopter, the combination of a lifting propeller the diameter of which is at least 42 feet, driving means therefor, and speed reducing means between said driving means and propeller, said speed reducing means reducing the speed of the propeller to many times less than that of the driving means.

41. A helicopter having a lifting propeller provided with lifting blades arranged at a pitch angle to the horizontal greater by a few degrees than the most efficient angle of pitch for the blades in passing horizontally through the air.

42. A helicopter having a lifting propeller the blade area of which is no greater than 6% of the propeller disk area, said propeller being formed of light construction from a strong material such as metal and having long narrow blades.

43. A helicopter having a lifting propeller the blade area of which is no greater than 6% of the propeller disk area, said propeller having aeroform blades and being formed of light construction from strong material such as metal.

44. In a helicopter, a propeller having a blade the pitch angle of which diminishes toward the axis of the propeller.

45. A helicopter having a lifting propeller, the diameter of which is no less than $$.7\frac{T}{H.P.} \times \frac{\sqrt{T}}{17},$$

where the lift per horse power is no less than 12 pounds per horse power, driving means, and speed reducing means between said driving means and propeller, having a reduction of at least 8 revolutions to 1 revolution.

In testimony whereof, I have signed my name to this specification.

PETER COOPER HEWITT.